(12) United States Patent
Mäki-Ontto et al.

(10) Patent No.: US 8,878,404 B2
(45) Date of Patent: Nov. 4, 2014

(54) ARRANGEMENT AND METHOD FOR COOLING AN ELECTRICAL MACHINE

(75) Inventors: Petri Mäki-Ontto, Espoo (FI); Yrjö Tyllinen, Tervakoski (FI); Pekka Kanninen, Espoo (FI)

(73) Assignee: ABB Technology AG, Zürich (CH)

( * ) Notice: Subject to any disclaimer, the term of this patent is extended or adjusted under 35 U.S.C. 154(b) by 324 days.

(21) Appl. No.: 13/516,923

(22) PCT Filed: Dec. 15, 2010

(86) PCT No.: PCT/FI2010/051035
§ 371 (c)(1),
(2), (4) Date: Sep. 21, 2012

(87) PCT Pub. No.: WO2011/073520
PCT Pub. Date: Jun. 23, 2011

(65) Prior Publication Data
US 2013/0009496 A1   Jan. 10, 2013

(30) Foreign Application Priority Data

Dec. 17, 2009   (FI) ..................................... 20096342

(51) Int. Cl.
*H02K 9/00* (2006.01)
(52) U.S. Cl.
USPC .............................................. 310/59; 310/58
(58) Field of Classification Search
USPC ............................. 310/59, 58, 60 R, 60 A, 61
See application file for complete search history.

(56) References Cited

U.S. PATENT DOCUMENTS

| 3,531,668 A | 9/1970 | Cathey |
| 4,845,394 A | 7/1989 | Kleinhans |

(Continued)

FOREIGN PATENT DOCUMENTS

| DE | 1813190 U | 6/1960 |
| DE | 1231797 B | 1/1967 |

(Continued)

OTHER PUBLICATIONS

International Search Report (PCT/ISA/210) issued on Apr. 26, 2012, by the European Patent Office as the International Searching Authority for International Application No. PCT/FI2010/051035.

(Continued)

*Primary Examiner* — Hanh Nguyen
(74) *Attorney, Agent, or Firm* — Buchanan Ingersoll & Rooney PC

(57) ABSTRACT

In an arrangement for cooling an electrical machine, the electrical machine includes a rotor and a stator located at the end of an air gap from the rotor. The rotor includes at least one axial cooling channel originating from the first end of the rotor that is connected to at least two axially successive cooling channels that are substantially radial within the rotor. The stator is made of sheets using axially successive core modules. The stator includes a radial cooling channel between two core modules. Gaseous cooling agent is led to the cooling channels of the rotor and stator from the end of the rotor. The outer surface of the stator core module includes a cooling jacket by the length (L) of the stator core module at maximum, and liquid cooling agent is led to the cooling jacket.

20 Claims, 3 Drawing Sheets

(56) References Cited

U.S. PATENT DOCUMENTS

| | | | |
|---|---|---|---|
| 5,633,543 A * | 5/1997 | Jarczynski et al. | 310/59 |
| 5,939,805 A * | 8/1999 | Vanduyn | 310/58 |
| 6,222,289 B1 | 4/2001 | Adames | |
| 6,359,350 B1 * | 3/2002 | Kaiho et al. | 310/52 |
| 6,552,452 B2 * | 4/2003 | Ferguson | 310/61 |
| 7,348,697 B2 * | 3/2008 | Kreitzer | 310/59 |
| 8,362,661 B2 * | 1/2013 | DeBlock et al. | 310/59 |
| 2003/0034701 A1 | 2/2003 | Weeber et al. | |
| 2010/0176670 A1 * | 7/2010 | Gottfried | 310/61 |
| 2011/0181137 A1 * | 7/2011 | Kori et al. | 310/59 |

FOREIGN PATENT DOCUMENTS

| | | |
|---|---|---|
| DE | 10122425 A1 | 11/2002 |
| EP | 0299908 A1 | 1/1989 |
| EP | 1109288 A1 | 6/2001 |
| EP | 1286448 A1 | 2/2003 |
| JP | 61-66542 A | 4/1986 |
| WO | WO 03/041241 A2 | 5/2003 |

OTHER PUBLICATIONS

Finnish Search Report issued on May 24, 2012, for Finnish Application No. 20096342.

* cited by examiner

ARRANGEMENT AND METHOD FOR COOLING AN ELECTRICAL MACHINE

SCOPE OF THE INVENTION

The object of the invention is an arrangement for cooling an electrical machine according to the Preamble in Claim 1, an electrical machine according to the Preamble in Claim 10, and a method for cooling an electrical machine according to Preamble in Claim 11.

BACKGROUND ART

Electrical machines are cooled to remove the heat generated within them. Heat is mostly generated in the active part of the electrical machine, the stator and the rotor, by magnetic and resistance losses.

Copper losses are created in the resistive conductors of electrical machine windings when part of the electric current transforms into heat. The variable magnetic flux causes iron losses in the iron parts of the motor and generator, including eddy-current losses and hysteresis losses.

In addition, mechanical losses occur in rotating electrical machines, such as bearings, or as turbulence on the rotor surface.

Heat losses thus created in machines must be conducted away to prevent the machines from heating until a balance is reached between the generated heat energy and the heat energy being conducted away from the machine.

Electrical machines are designed to comply with a particular insulation class. Winding insulation is selected to allow a reasonable lifetime in the chosen insulation class. If the electrical machine operates in an overheated condition due to overload or deterioration of the cooling system, the insulation lifetime will decrease rapidly.

Air is normally used as the coolant in small electrical machines of less than 1 . . . 2 MW. In larger electrical machines, liquid coolant is used; the most common liquid coolant is water. In many arrangements, the actual coolant is air that is cooled using water.

In liquid-cooled electrical machines, the cooling agent does not come into direct contact with the cooled components. The cooling agent is led into the electrical machine in closed pipes or channels, and removed from the machine when warmed up. The cooling circuit is either a closed circuit, in which case the heated cooling agent is cooled in a heat exchanger before flowing back into the electrical machine, or an open circuit, in which case the heated cooling agent is removed from the system.

Compared to air cooling on the outer surface, the heat transfer efficiency of liquid cooling is considerably better. However, a disadvantage of liquid cooling is that cooling can only be directed at a small area.

DESCRIPTION OF INVENTION

The purpose of the present invention is to create an arrangement and method for cooling an electrical machine efficiently.

In order to achieve this, the invention is characterized by the features specified in the characteristics section of Claims 1, 10 and 11. Some other preferred embodiments of the invention have the characteristics specified in the dependent claims.

In the arrangement according to the invention for cooling an electrical machine, the electrical machine comprises a rotor and a stator located at the end of an air gap from the rotor. The rotor comprises at least one axial cooling channel originating from the first end of the rotor that is connected to at least two axially successive cooling channels that are substantially radial within the rotor. The stator is made of sheets using axially successive core modules. The stator comprises a radial cooling channel between two core modules. Gaseous cooling agent is led to the cooling channels of the rotor and stator from the end of the rotor. The outer surface of the stator core module comprises a cooling jacket of the length of the stator core module at maximum, and liquid cooling agent is led to the cooling jacket.

An electrical machine according to the invention comprises a rotor and a stator located at the end of an air gap from the rotor. The rotor comprises at least one axial cooling channel originating from the first end of the rotor that is connected to at least two axially successive cooling channels that are substantially radial within the rotor. The stator is made of sheets using axially successive core modules. The stator comprises a radial cooling channel between two core modules. Gaseous cooling agent is led to the cooling channels of the rotor and stator from the end of the rotor. The outer surface of the stator core module comprises a cooling jacket of the length of the stator core module at maximum, and liquid cooling agent is led to the cooling jacket.

In the method according to the invention for cooling an electrical machine, the electrical machine comprises a rotor and a stator located at the end of an air gap from the rotor. In the method, gaseous cooling agent is led within the rotor to the axial cooling channel originating from the first end of the rotor. The cooling channel is connected to at least two axially successive cooling channels that are substantially radial within the rotor. The cooling agent is further led to the stator to a radial cooling channel located between two axially successive core modules. Liquid cooling agent is led to a cooling jacket of the length of the stator core module at maximum located on the outer surface of the stator core module.

In the invention the liquid cooling for an electrical machine is combined with air cooling based on radial cooling channels. The rotor and coil ends are cooled with gaseous cooling agent, and the stator is cooled with gaseous and liquid cooling agent. The stator cools through conduction to the cooling jacket located against the stator back and through convection to the gaseous cooling agent circulating within the machine through radial air channels. The gaseous cooling agent is led through the radial cooling channel of the stator further between the ends of two axially successive cooling jackets.

The cooling jacket surrounding the stator is built of modules that are as long as a single stator core module. The sizing of the cooling jackets allows the gaseous cooling agent to flow out of the cooling channels created between the stator core modules freely. The sizes of the cooling jacket module can be standardized; thus making inexpensive serial manufacturing possible.

According to an embodiment of the invention, the cooling agent circulation of at least two axially successive cooling jackets is interconnected. The cooling jackets can be connected in series, in which case the cooled liquid cooling agent flows to the first cooling jacket, followed by the second cooling jacket. The cooling jackets can also be connected in parallel, in which case the cooled liquid cooling agent is distributed to the first and second cooling jacket. The cooling jackets can also be connected in series and parallel. For the cooling of the stator, it is preferred that the outer surface of the stator is evenly covered by a cooling jacket so that a cooling jacket is on the outer surface of each stator core module.

In the cooling arrangement in accordance with the invention, the cooling jacket can also cool down a gaseous cooling agent, in which case a separate heat exchanger is not required for the closed circulation of the gaseous cooling agent. In this case, the gaseous cooling agent is conducted to flow to the end of the rotor through the stator's radial channels so that it is in a heat transfer contact with the cooling jacket. The gaseous cooling agent circulation system is a closed gaseous cooling agent circulation system. The gaseous cooling agent is circulated either in the electrical machine or in the electrical machine and a separate heat exchanger.

In order to improve the efficiency of heat transfer between the liquid cooling agent flowing in the cooling jacket and the gaseous cooling agent, the outer cooling jacket surface can be ribbed, or separate ribs can be installed on its surface. If a separate heat exchanger is used for cooling the gaseous cooling agent, the liquid cooling agent circulation of the heat exchanger can be connected in series or parallel with the cooling jacket.

The gaseous cooling agent can circulate within the electrical machine symmetrically or asymmetrically. In symmetrical cooling, the flow of gaseous cooling agent is divided into two and the cooling agent is led into the rotor at its both ends. The cooling agent passes through the rotor and stator through two symmetrical routes, where as in asymmetrical cooling the gaseous cooling agent flows through the rotor and stator through one route. In asymmetrical cooling, a blower is installed in the electrical machine for returning the gaseous cooling agent always to the same end of the electrical machine.

According to another embodiment of the invention, axial channels are generated on the outer surface of the cooling jacket for the gaseous cooling agent. Moreover, the gaseous cooling agent flows in opposite directions in two parallel channels in transverse direction. In this case, the gaseous cooling agent flows towards the first end of the electrical machine in every other channel, and towards the other end of the electrical machine in the other channels. The embodiment is favorable in an asymmetrical cooling embodiment where the gaseous cooling agent is led in through the first end of the electrical machine and out through the other end. By placing the channels in parallel, the diameter of an asymmetrically cooled electrical machine can be the same as that of a symmetrically cooled electrical machine.

The arrangement and method in accordance with the invention are favored for a quickly rotating electrical machine equipped with permanent magnets because cold gaseous cooling agent can cool down the rotor containing the permanent magnets.

FIGURES IN THE DRAWINGS

In the following, the invention will be described in more detail with the help of certain embodiments by referring to the enclosed drawings, where:

DETAILED DESCRIPTION

Figure 1:
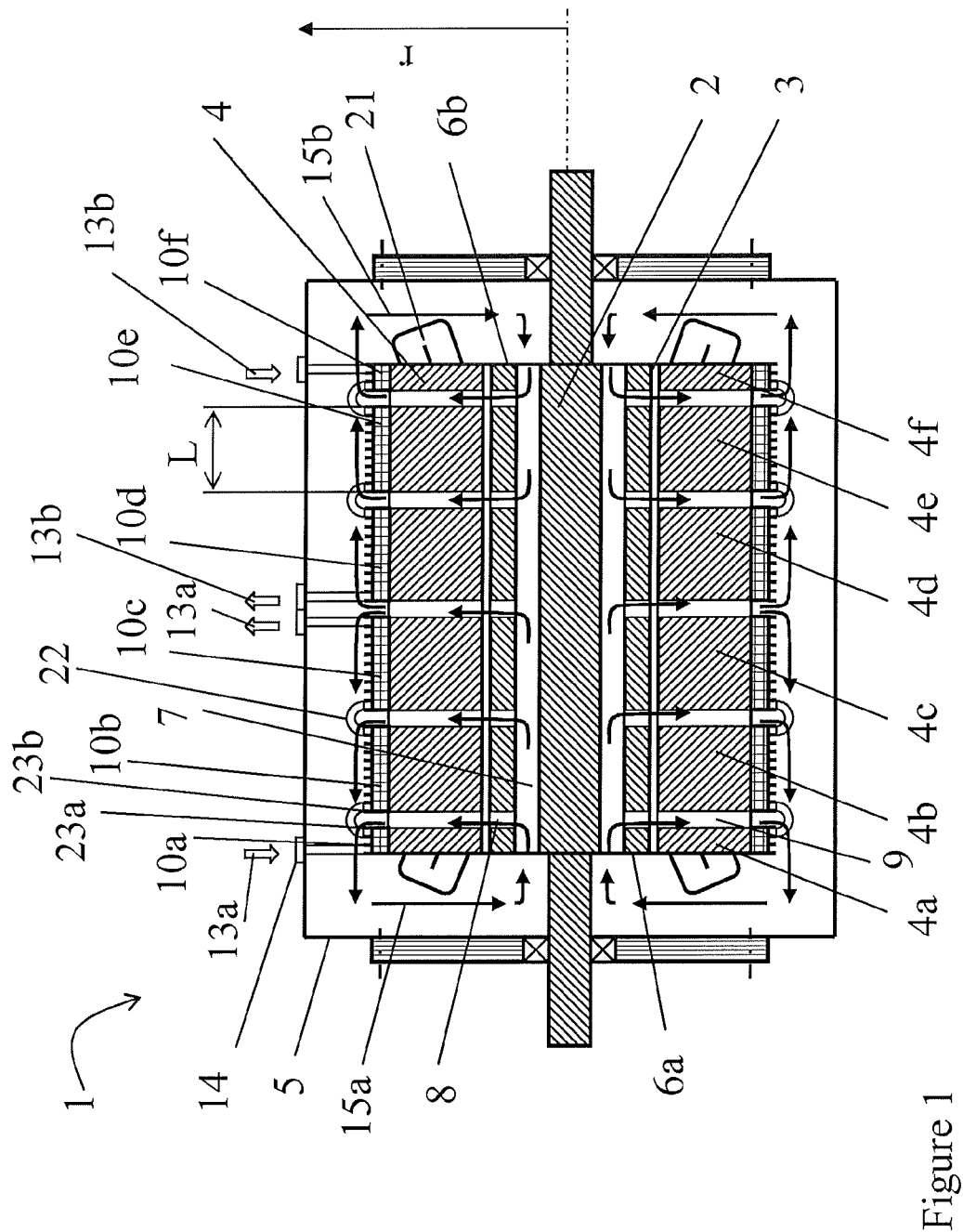
FIG. 1 illustrates the symmetrical cooling arrangement of the electrical machine.
Figure 2:
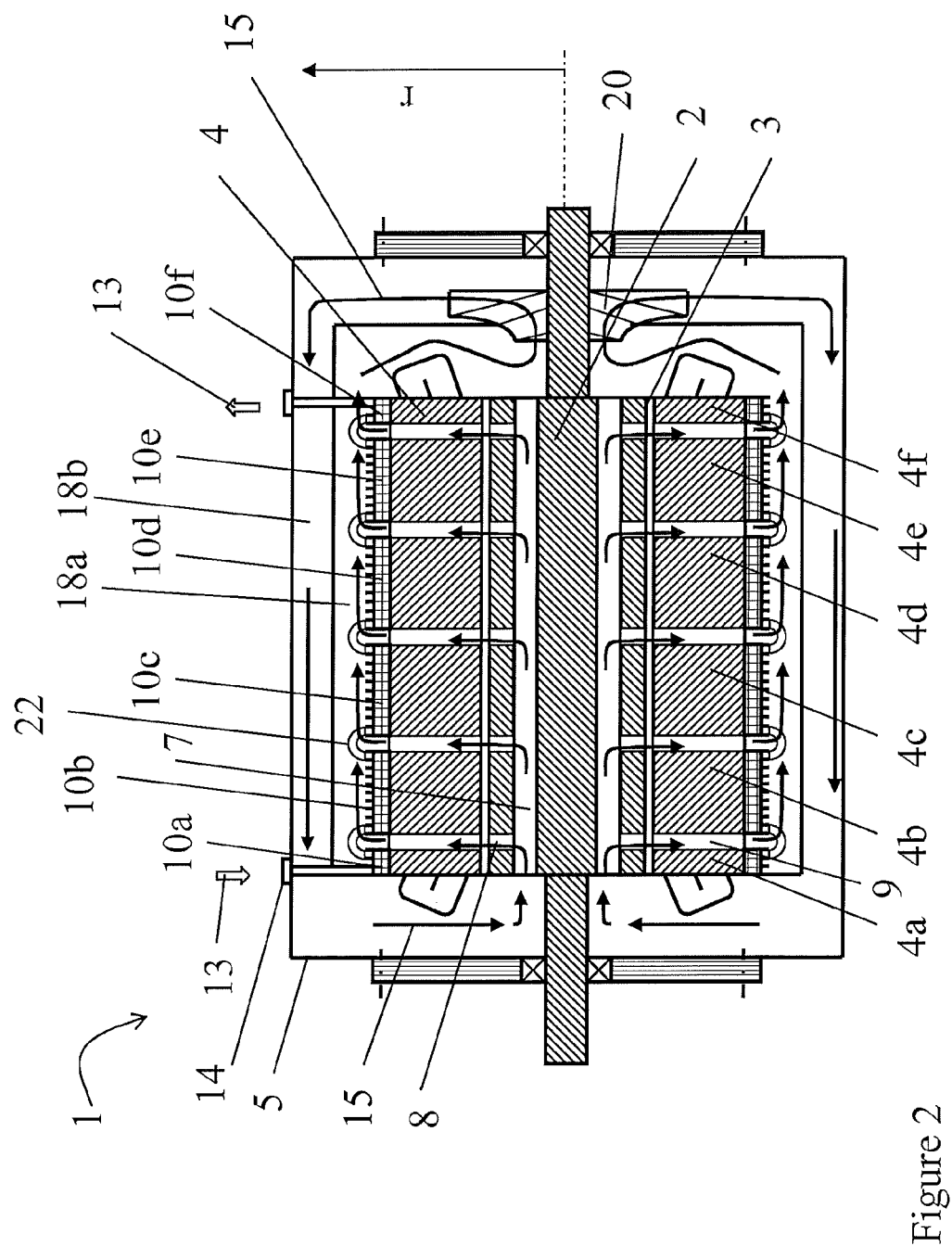
FIG. 2 illustrates the asymmetrical cooling arrangement of the electrical machine.

The electrical machine 1 illustrated in the figures is a permanent-magnet motor or a permanent-magnet generator. FIGS. 1 and 2 illustrate a cross-section of an electrical machine and an arrangement to cool an electrical machine.

The electrical machine 1 comprises a rotor 2 and a stator 4 located at the end of an air gap 3 from the rotor 2. The electrical machine frame 5 is around the outer surface 12 of the stator 4. The rotor 2 comprises axial cooling channels 7 originating from the first end 6a of the rotor. The axial cooling channels extend to the second end 6b of the rotor. The cooling channels 7 are joined with a plurality of axially successive cooling channels 8 that are substantially radial r with the rotor. The radial cooling channels 8 are open towards the air gap 3 of the electrical machine 1.

The stator 4 is made of stator core modules 4a-f generated of thin sheets stacked on top of one another. The core modules 4a-f are axially successive. A radial cooling channel 9 is generated between the core modules 4a-f for the cooling agent by placing a duct pin between the core modules 4a-f to separate them from one another.

The outer surface 12 of the stator 4 core module comprises, at maximum, a cooling jacket 10a-f of the length L of the stator 4 core module 4a-f to which liquid cooling agent 13 is led. The cooling jacket 10a-f is in a heat transfer contact with the outer surface 12 of the stator 4 core module. The liquid cooling agent can be water, for example. The cooling jacket 10a-f preferably extends axially to the outer surface 12 of the core module 4a-f throughout the distance so that as much of the core module's outer surface as possible can be used as a heat transfer area. The cooling jacket 10 is cylindrical in shape and the inner surface 11 of the cooling jacket 10a-f follows the shape of the outer surface 12 of the stator 4 core module 4a-f. The cooling jacket 10a-f contains at least two units—one for the inflow of the liquid cooling agent 13 and the other for its return flow. The liquid cooling agent 13 circulating in the cooling jacket 10a-f is circulated using a pump and cooled in a heat exchanger outside the electrical machine frame 5.

In the electrical machine 1, the rotor 2 is cooled with gaseous cooling agent, and the stator 4 is cooled with gaseous 15 and liquid 13 cooling agent. The gaseous cooling agent 15 is conducted in the rotor 2 to the axial cooling channels 7 originating from the first end 6a of the rotor. The cooling channels 7 are joined with axially successive cooling channels 8 that are substantially radial r with the rotor. The cooling agent 15 turns to flow to the rotor's radial cooling channels 8 towards the rotor 2 rim and air gap 3. From the air gap, the cooling agent 15 is conducted further to the stator 4 to the radial cooling channels 9 that are located between the axially successive core modules 4a-f and are open towards the stator's 4 outer rim. The liquid cooling agent 13 is conducted to the stator 4 core modules to the cooling jackets 10a-f that are located on the outer surfaces and are no longer than the length L of the stator 4 core module 4a-f.

As even cooling of the stator 4 as possible can be achieved by connecting the cooling agent circulations of the cooling jackets 10a-f in parallel. In this case, for example, two units 14 are generated in the frame 5 of the electrical machine 1 for the liquid cooling agent 13, and inflow and return manifolds are generated of the units 14 inside the frame 5. Each cooling jacket 10a-f is connected to the inflow and return manifold. In this case, the cooling agent circulation of each cooling jacket 10a-f is independent of the cooling agent circulation of the other cooling jacket 10a-f.

The liquid cooling agent circulations of the cooling jackets 10a-f can also be connected to each other. In FIG. 1, the liquid cooling agent 13a, b is conducted to the cooling jackets 10a, 10f that are closest to the rotor ends 6a-b at both ends of the electrical machine through the units 14 made in the frame 5 of the electrical machine 1. The cooling agent circulation of the cooling jackets 10a, 10f is connected to the axially following cooling jacket 10b using, for example, a tube or hose 22. The cooling agent 13a, b is removed from the axially central cooling jackets 10c, 10d in the middle of the stator 4 through the units made in the frame 5 of the electrical machine 1.

In FIG. 2, the liquid cooling agent 13 is conducted to the cooling jacket closest to the first end 6a of the rotor through the unit made in the frame 5 of the electrical machine 1. The cooling agent circulation of the cooling jacket 10a is connected to the axially following cooling jacket 10b using, for example, a tube or hose 22. The cooling agent 13 is removed from the axially last cooling jacket 10f at the other end 6b of the rotor through the unit made in the frame 5 of the electrical machine 1.

The cooling agent jackets 10a-f of the length of the stator 4 can also be generated into more uniform cooling jacket entities. The cooling agent jackets 10a-f can be connected to each other from several points at the axial ends of the cooling jackets 10a-f using channels so that the cooling agent flow from one cooling jacket 10a-f to another is possible. In this case, longitudinal holes in a transverse direction of the stator 4 are generated by the stator's radial cooling channels 9. The holes are axially limited to the ends of the cooling jackets 10a-f and radially to the cooling agent channels.

In FIG. 1, the gaseous cooling agent 15 comprises two flows. The first gaseous cooling agent 15a flow is conducted into the rotor 2 through first end 6a of the rotor and the second gaseous cooling agent 15b flow is conducted into the rotor 2 through the second end 6b of the rotor. The gaseous cooling agent 15a, b flows are conducted in the axial cooling channels 7.

The gaseous cooling agent 15a, h flows flow towards the axial middle of the rotor 2 from each of the rotor ends 6a, b. As the gaseous cooling agent 15a, b flows reach a join of the axial cooling channel 7 and the radial cooling channel 8 in the rotor, part of the gaseous cooling agent 15a, b flows turn to flow to the radial cooling channels 8 towards the rotor 2 rim and air gap 3. From the air gap 3, the gaseous cooling agent 15a, b is conducted further to the stator 4 to a plurality of radial cooling channels 9. The radial cooling channels 9 are located between the axially successive core modules 4a-f and are open towards the stator's 4 outer rim. The cooling agent 15a, b flowing through the radial cooling channel 9 flows further between ends 23a, h of two axially successive cooling jackets 10a, h. Between the frame 5 and the cooling jacket 10a-f is a free space forming a channel for the gaseous cooling agent 15a, b flows for the gaseous cooling agent 15a-b to flow to the ends of the rotor 6a, b.

The gaseous cooling agent circulation system is a closed system, where the gaseous cooling agent is circulated within the frame 5 of the electrical machine 1.

The liquid cooling agent 13a, b flow comprises two flows. The first cooling agent 13a flow is conducted to the axially first cooling jacket 10a that is located on the outer surface of the axially first core module 4a. The second cooling agent 13b flow is conducted to the axially last cooling jacket 10f that is located on the outer surface of the axially last core module 4f.

A cooling jacket 10a-f comprises a ring shaped hollow body around the stator core module 4a-f. The cooling jacket 10a-f comprises an inlet unit and an outlet unit for the liquid cooling agent 13a, b and one or more flow channels for the liquid cooling agent 13a, b inside the body. The length of the ring shaped body in axial direction is at maximum the length L of the core module. The inner surface of the ring shaped body is in heat transferring contact with the core module 4a-f.

The cooling jackets 10a-f are connected in two series. The first cooling jacket series starts from the axially first cooling jacket 10a and comprises several axially successive cooling jackets 10a-c. The second cooling jacket series starts from the axially last cooling jacket 10f and comprises several axially successive cooling jackets 10f-d. The first liquid cooling agent 13a flow circulate through the first cooling jacket series 10a-c and the second liquid cooling agent 13b flow circulate through the second cooling jacket series 10f-d. The first and the second liquid cooling flows 13a, h are extracted from the electrical machine 1 via one or more outlets made to the frame 5.

The cooling embodiment of FIG. 1 is symmetrical, producing efficient cooling for the electrical machine's coil ends 21.

In FIG. 2, the gaseous cooling agent 15 is conducted into the rotor 2 from the first end 6a of the rotor using a blower 20. The gaseous cooling agent 15 flows from the rotor to the air gap 3 of the electrical machine 1 through radial cooling channels 8 and further to the outer surface 12 of the stator through the stator's 4 radial cooling channels 9. The gaseous cooling agent 15 flows to the other end of the stator 4 in the axial channel 18a generated on the outer surface 16 of the cooling jacket 10a-f. The gaseous cooling agent 15 is led back to the first end 6a of the rotor 2 in an axial channel 18b which is radially r above the previous channel 18a. The channels 18a, 18b are radially r on top of each other. The cooling embodiment is asymmetrical.

Figure 3:
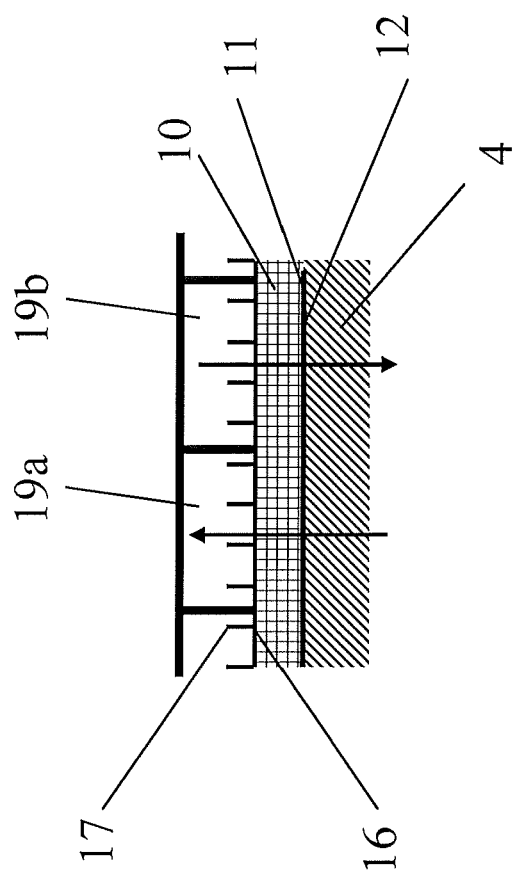
FIG. 3 illustrates the channeling arrangement for gaseous cooling agent.

In FIGS. 1-3, the gaseous cooling agent 15, 15a-b heated in the rotor 2 and stator 4 is cooled using the cooling jackets 10a-f. The outer surface 16 of the cooling jacket 10a-f contains ribs 17 for improving the efficiency of heat transfer between the cooling jacket 10a-f and gaseous cooling agent 15, 15a-b.

FIG. 3 illustrates parallel axial channels 19a, 19b generated on the outer surface 16 of the cooling jacket for the gaseous cooling agent 15.

The axial channels 19a, 19b extend uniformly throughout the length of the stator 4 formed of core modules 4a-f. In two parallel channels 19a, 19b in transverse direction, the gaseous cooling agent 15 flows in opposite directions. The embodiment is favorable in an asymmetrical cooling embodiment where the gaseous cooling agent 15 is led in through the first end of the electrical machine 1 and out through the other end.

The channel 19a, the inflow channel, where the flow of the gaseous cooling agent 15 is from the first end 6a towards the other end 6b is open at the bottom by the stator's radial cooling channels 9 so that the cooling agent 15 can flow into the channel 19a. The channel 19b, the return channel, where the flow of the gaseous cooling agent is from the second end 6b towards the first end 6a is closed by the stator's radial cooling channels 9 so that the cooling agent 15 can flow to the first end 6a. The inflow and return channels 19a, 19b are interconnected at the second end of the electrical machine.

The gaseous cooling agent 15, 15a-b can also be conducted to a separate heat exchanger where it transfers its heat to the cooling agent flowing in the heat exchanger. The separate heat exchanger is installed on the top of the stator 4, for instance, or the separate heat exchanger is located outside of the frame 5 of the electrical machine 1. The type of the separate heat exchanger is a tube and bundle, for instance.

PARTS LIST 1 electrical machine; 2 rotor; 3 air gap; 4 stator; 4a-f stator core module; 5 frame; 6a-b rotor end; 7 cooling channel; 8 radial cooling channel; 9 stator's radial cooling channel; 10a-f cooling jacket; 11 inner cooling jacket surface; 12 outer stator surface; 13, 13a-b liquid cooling agent; 14 unit; 15, 15a-b gaseous cooling agent; 16 outer cooling jacket surface;

17 rib; 18a, b channel; 19a, b channel; 20 blower; 21 coil end; 22 tube; 23a-b cooling jacket end; L length; r radial direction.

The invention claimed is:

1. An arrangement comprising:
    an electrical machine having a rotor and a stator located at an end of an air gap originating from the rotor, the rotor having at least one axial cooling channel originating from a first end of the rotor, which cooling channel is connected to at least two axially successive cooling channels that are substantially radial (r) within the rotor, the stator being made of sheets using axially successive stator core modules, and the stator having a radial (r) cooling channel between two core modules, for receiving a gaseous cooling agent within the rotor and stator from the first end of the rotor; and
    an outer surface of at least one stator core module having a cooling jacket of a maximum length (L) of the stator core module for receiving a liquid cooling agent.

2. An arrangement according to claim 1, wherein the stator's radial cooling channel is configured for receiving a gaseous cooling agent which has been led between ends of two axially successive cooling jackets.

3. An arrangement according to claim 2, comprising:
    cooling agent circulations of at least two axially successive cooling jackets.

4. An arrangement according to claim 3, wherein the cooling jacket will cool the gaseous cooling agent during operation.

5. An arrangement according to claim 4, wherein the outer surface of each cooling jacket comprises:
    ribbing for cooling the gaseous cooling agent.

6. An arrangement according to claim 3, comprising:
    a conductor for conducting the gaseous cooling agent to the rotor from both ends of the rotor.

7. An arrangement according to claim 3, comprising:
    axial channels on the outer surface of each cooling jacket for the gaseous cooling agent, and configured such that gaseous cooling agent will flow in opposite directions in two parallel channels in transverse direction during operation.

8. An arrangement according to claim 3, wherein the cooling jacket comprises:
    a ring shaped hollow body.

9. An arrangement according to claim 1; comprising:
    cooling agent circulations of at least two axially successive cooling jackets.

10. An arrangement according to claim 1, wherein the cooling jacket will cool the gaseous cooling agent during operation.

11. An arrangement according to claim 10, wherein the outer surface of each cooling jacket comprises:
    ribbing for cooling the gaseous cooling agent.

12. An arrangement according to claim 1, comprising:
    a conductor for conducting the gaseous cooling agent to the rotor from both ends of the rotor.

13. An arrangement according to claim 1, comprising:
    axial channels on the outer surface of each cooling jacket for the gaseous cooling agent, and configured such that gaseous cooling agent will flow in opposite directions in two parallel channels in transverse direction during operation.

14. An arrangement according to claim 1, wherein the cooling jacket comprises:
    a ring shaped hollow body.

15. An arrangement according to claim 1, wherein the gaseous cooling agent circulation system is a closed system.

16. An electrical machine comprising:
    a rotor; and
    a stator located at the end of an air gap originating from the rotor, the rotor having at least one axial cooling channel originating from a first end of the rotor, which cooling channel is connected to at least two axially successive cooling channels that are substantially radial (r) within the rotor, the stator being made of sheets using axially successive core modules, and the stator having a radial cooling channel between two core modules for receiving a gaseous cooling agent within the rotor and stator from the first end of the rotor; and
    an outer surface of at least one stator core module having a cooling jacket of a maximum length (L) of the stator core module for receiving liquid cooling agent.

17. A method for cooling an electrical machine having a rotor and a stator located at an end of an air gap originating from the rotor, the method comprising:
    leading gaseous cooling agent to an axial cooling channel originating from a first end of the rotor, which cooling channel is connected to at least two axially successive cooling channels that are substantially radial (r) within the rotor
    leading the cooling agent to the stator to a radial cooling channel between two axially successive core modules; and
    leading liquid cooling agent to the cooling jacket of a maximum length (L) of at least one stator core module located on an outer surface of the at least one stator core module.

18. A method according to claim 17, comprising:
    leading the liquid cooling agent to a first cooling jacket, and from the first cooling jacket to a second axially successive cooling jacket.

19. A method according to claim 18, comprising:
    leading the gaseous cooling agent to flow at the end of the rotor from the stator's radial channels so that the gaseous cooling agent is in a heat transfer contact with at least one cooling jacket.

20. A method according to claim 17 comprising:
    leading the gaseous cooling agent to flow at the end of the rotor from the stator's radial channels so that the gaseous cooling agent is in a heat transfer contact with at least one cooling jacket.

* * * * *